Jan. 6, 1931.  W. T. HATMAKER  1,788,236
LIQUID DISPENSING PUMP
Filed Aug. 18, 1920  12 Sheets-Sheet 1

Inventor
W. T. HATMAKER.
By Edward Weed
Attorney

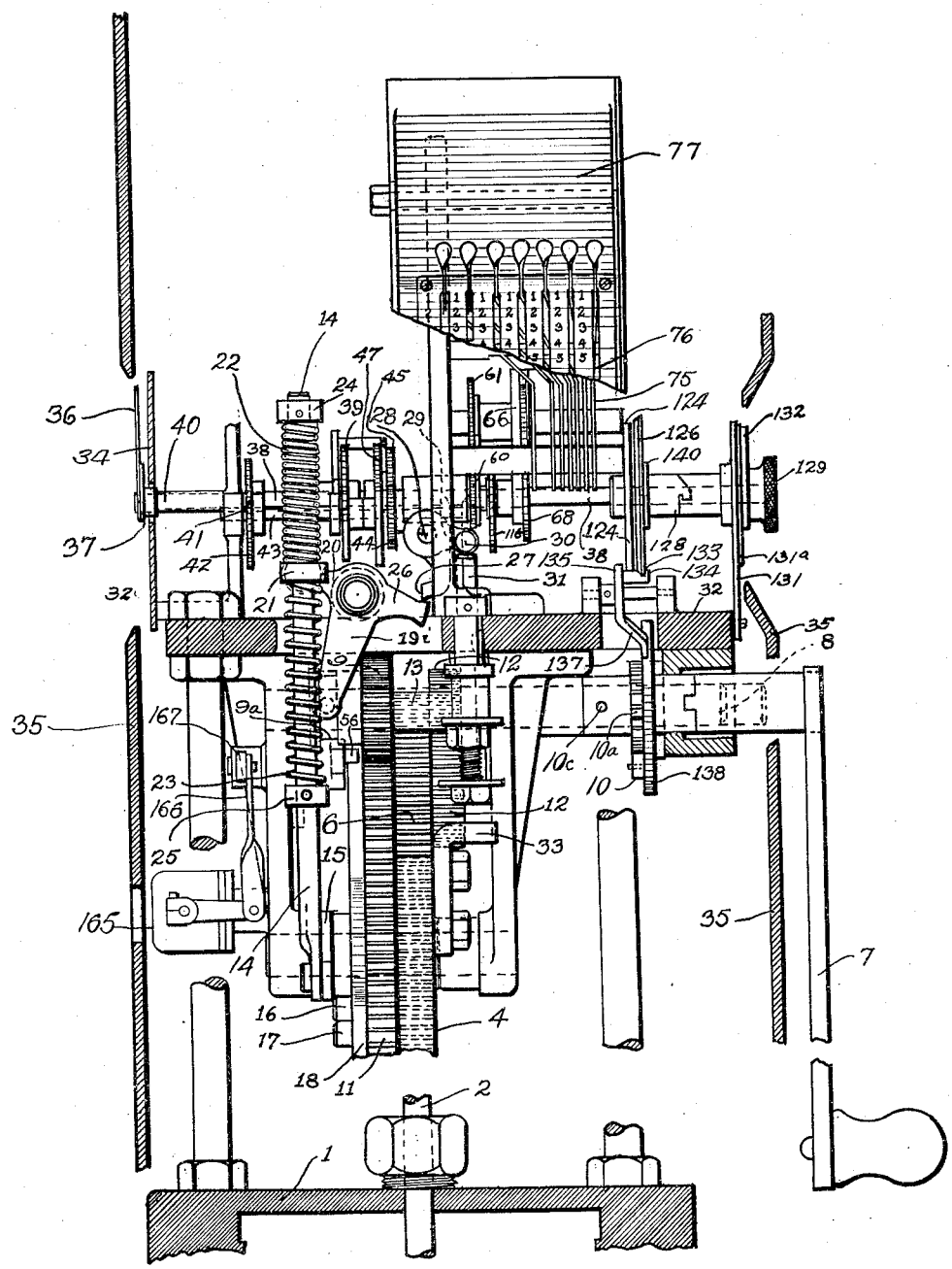

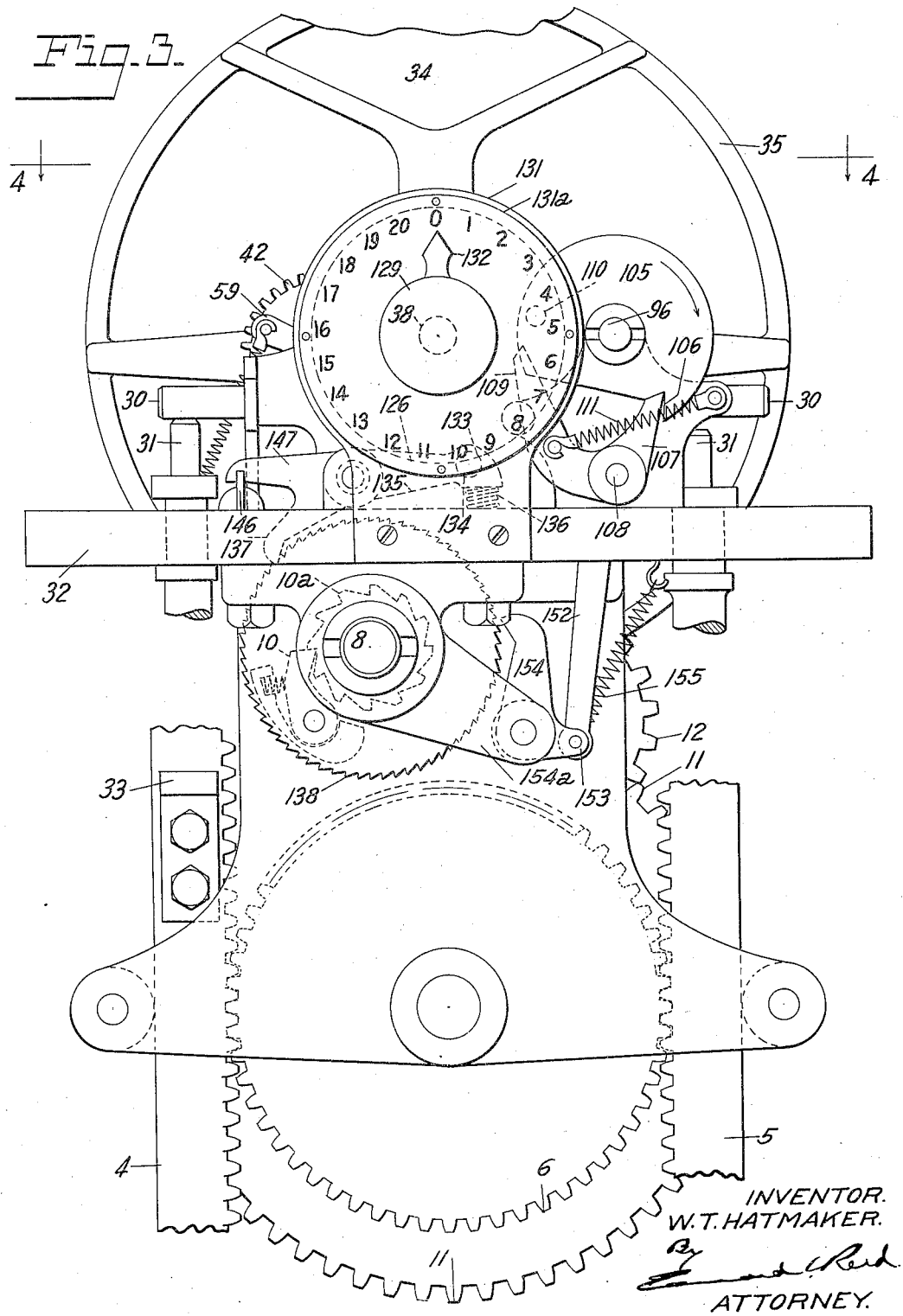

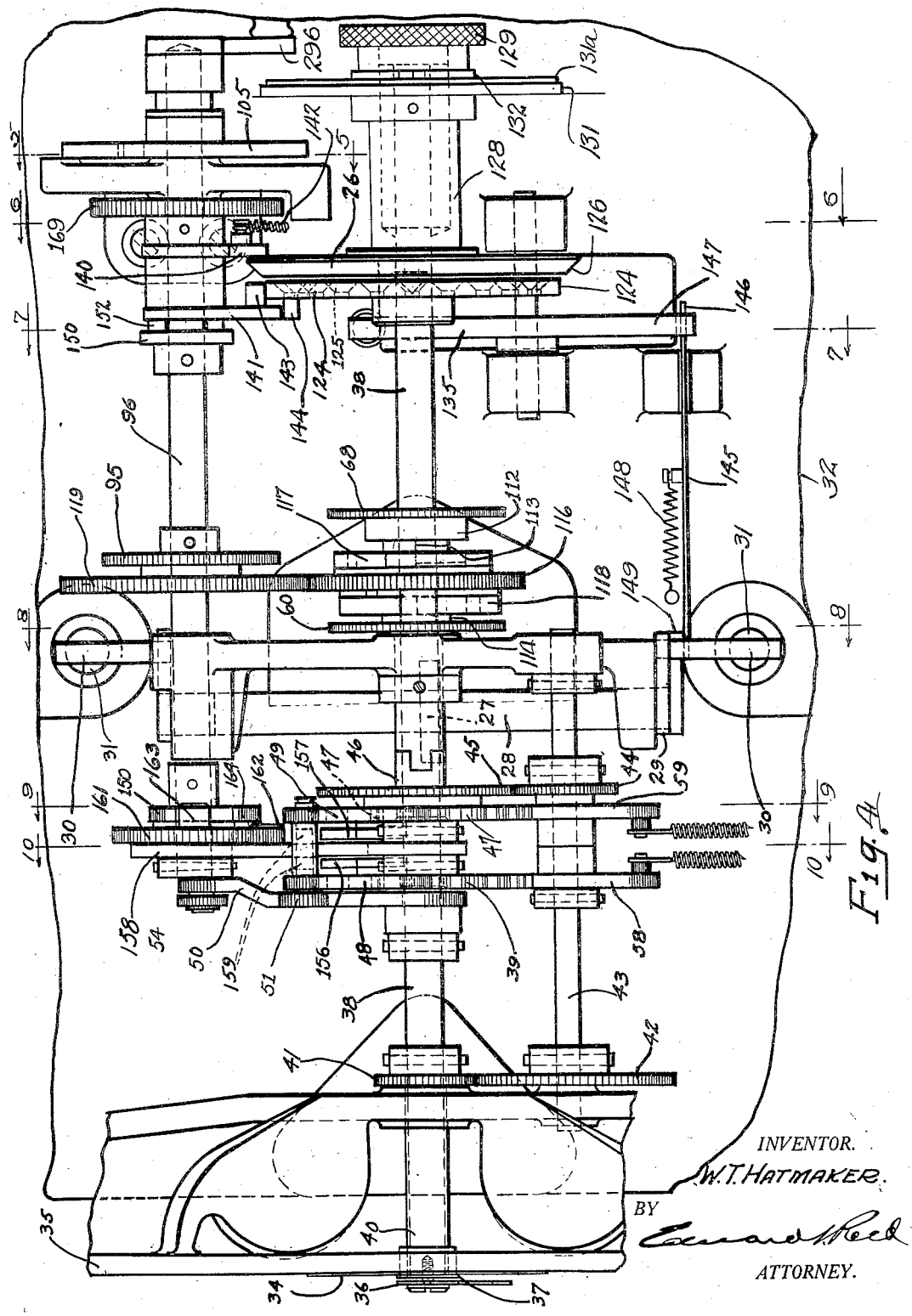

Jan. 6, 1931. W. T. HATMAKER 1,788,236
LIQUID DISPENSING PUMP
Filed Aug. 18, 1920    12 Sheets-Sheet 5
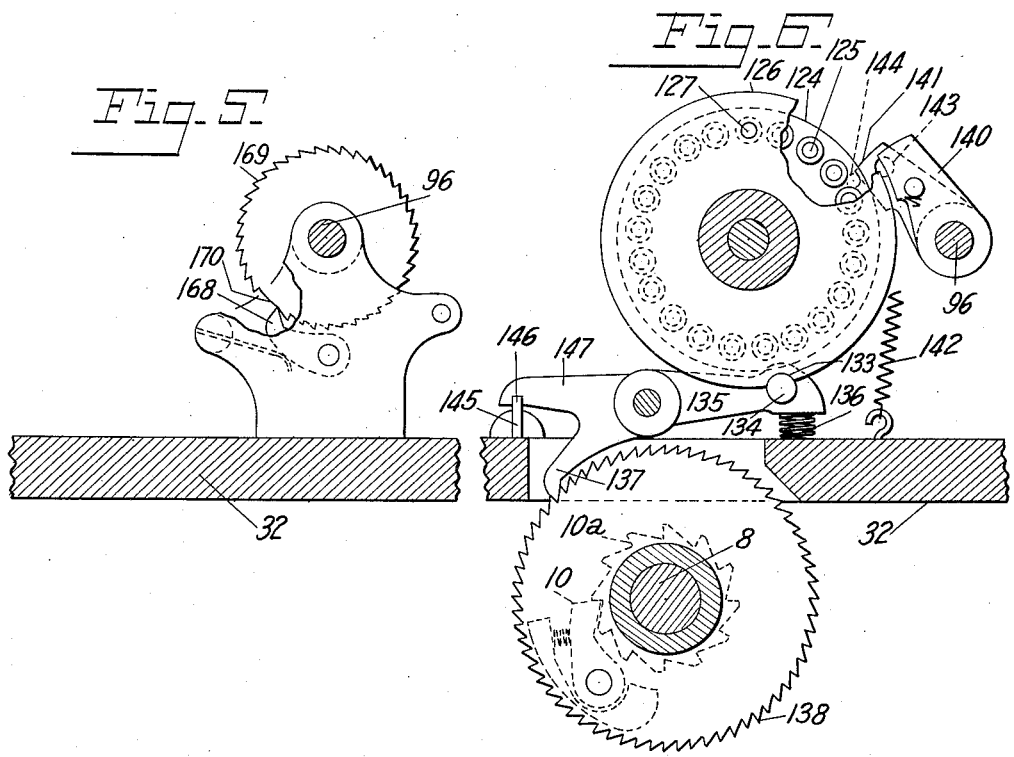
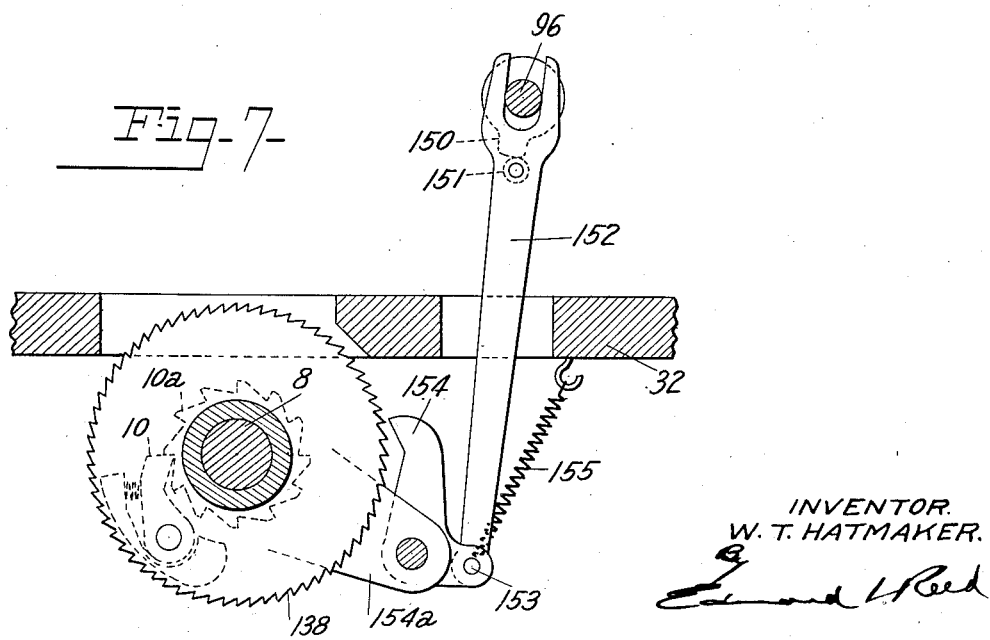
INVENTOR.
W. T. HATMAKER.
ATTORNEY.

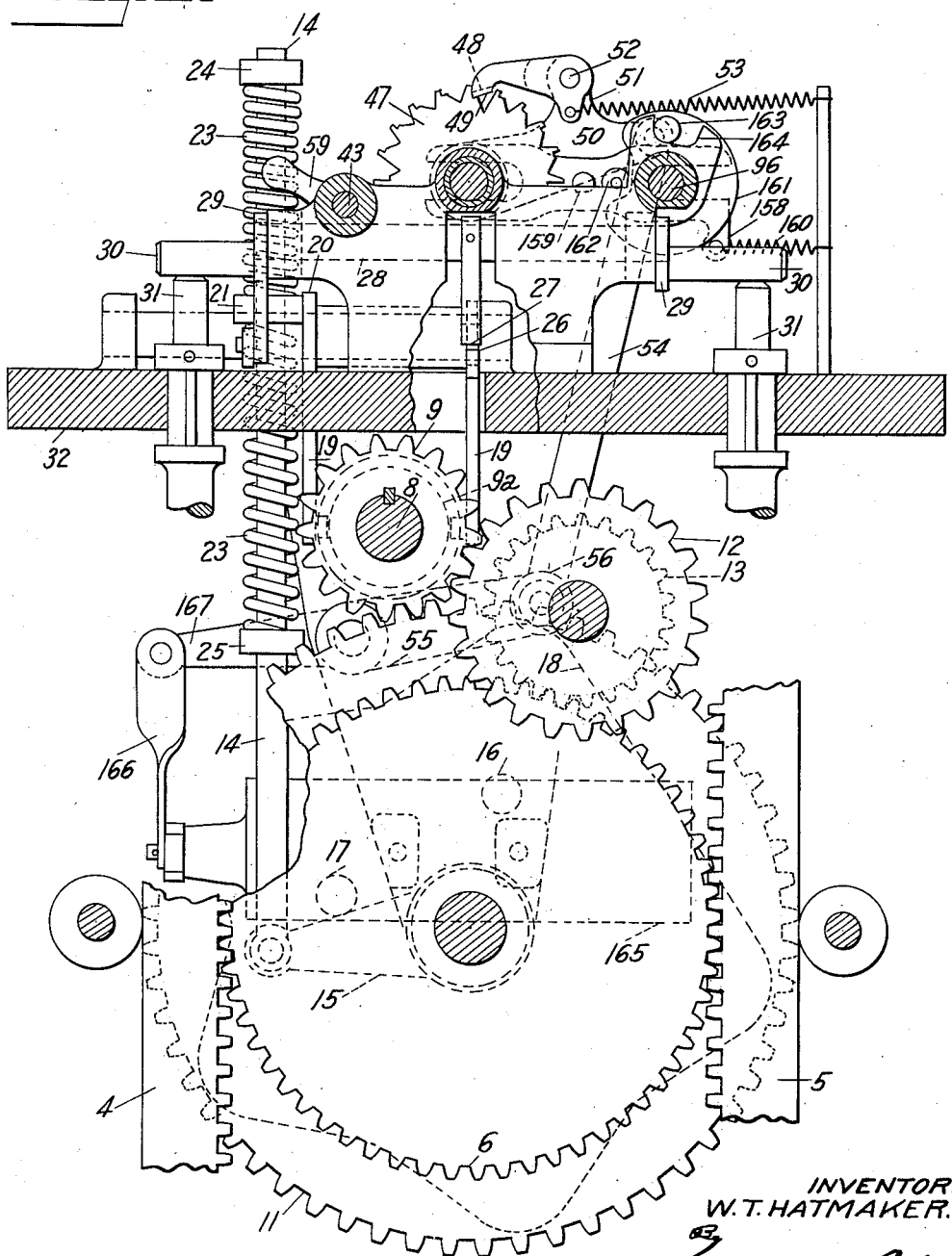

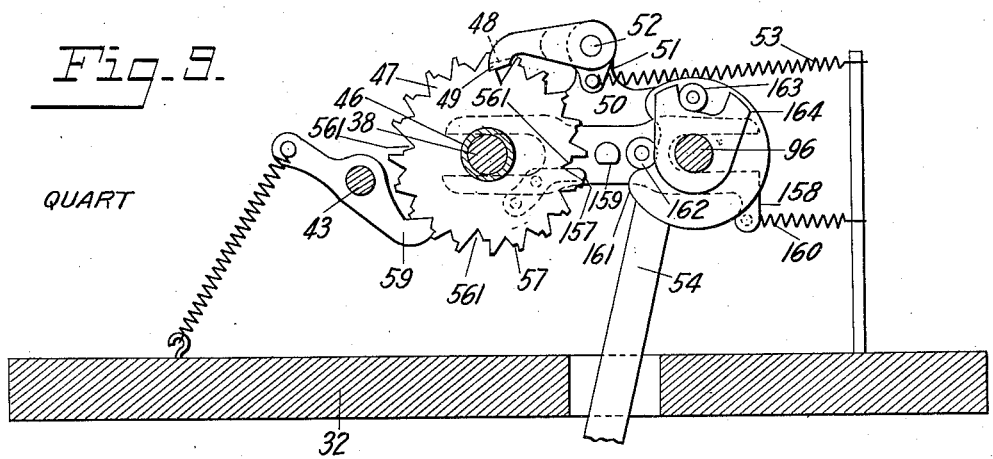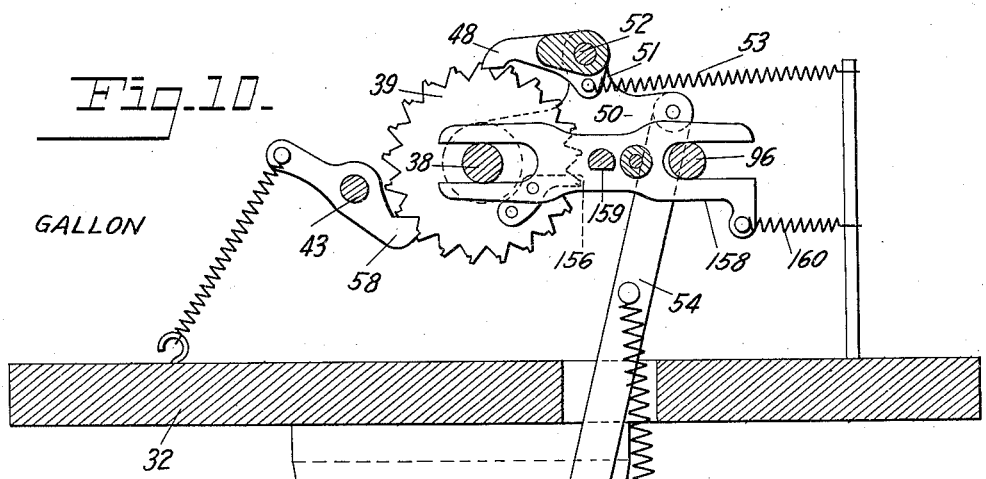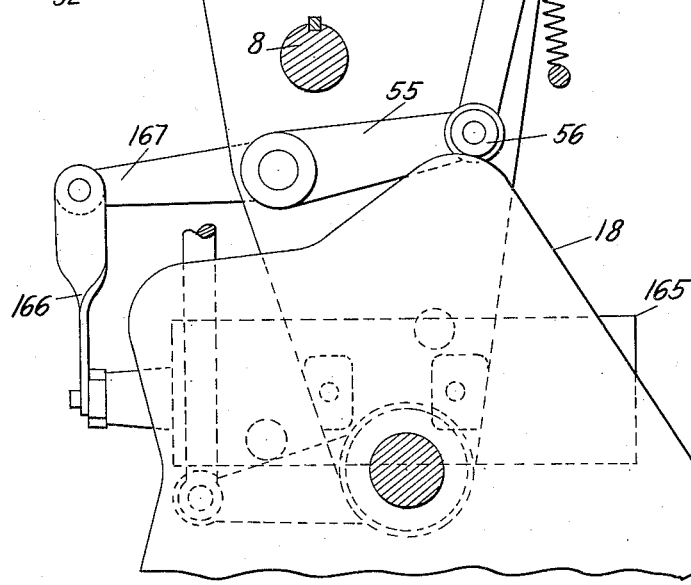

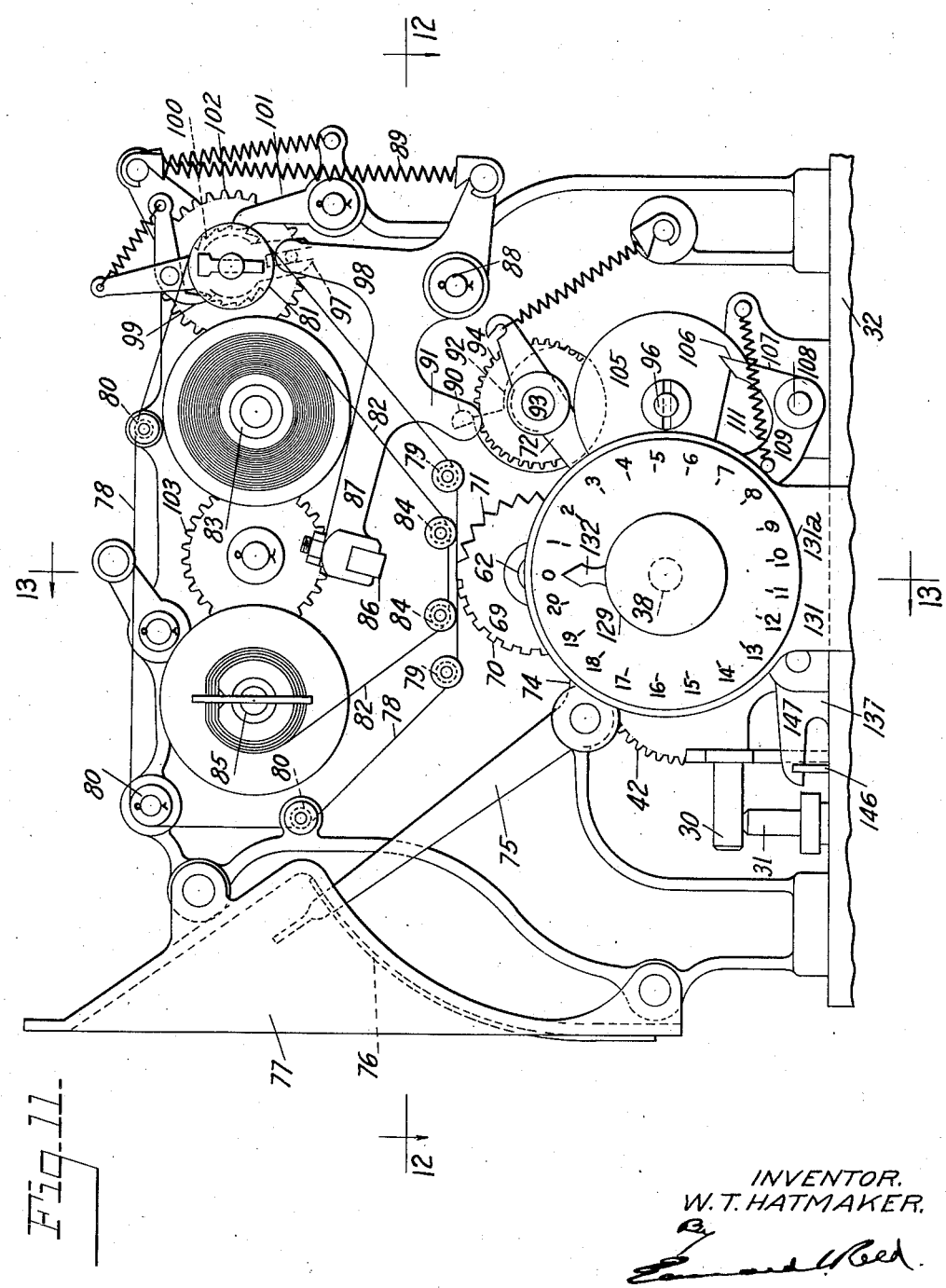

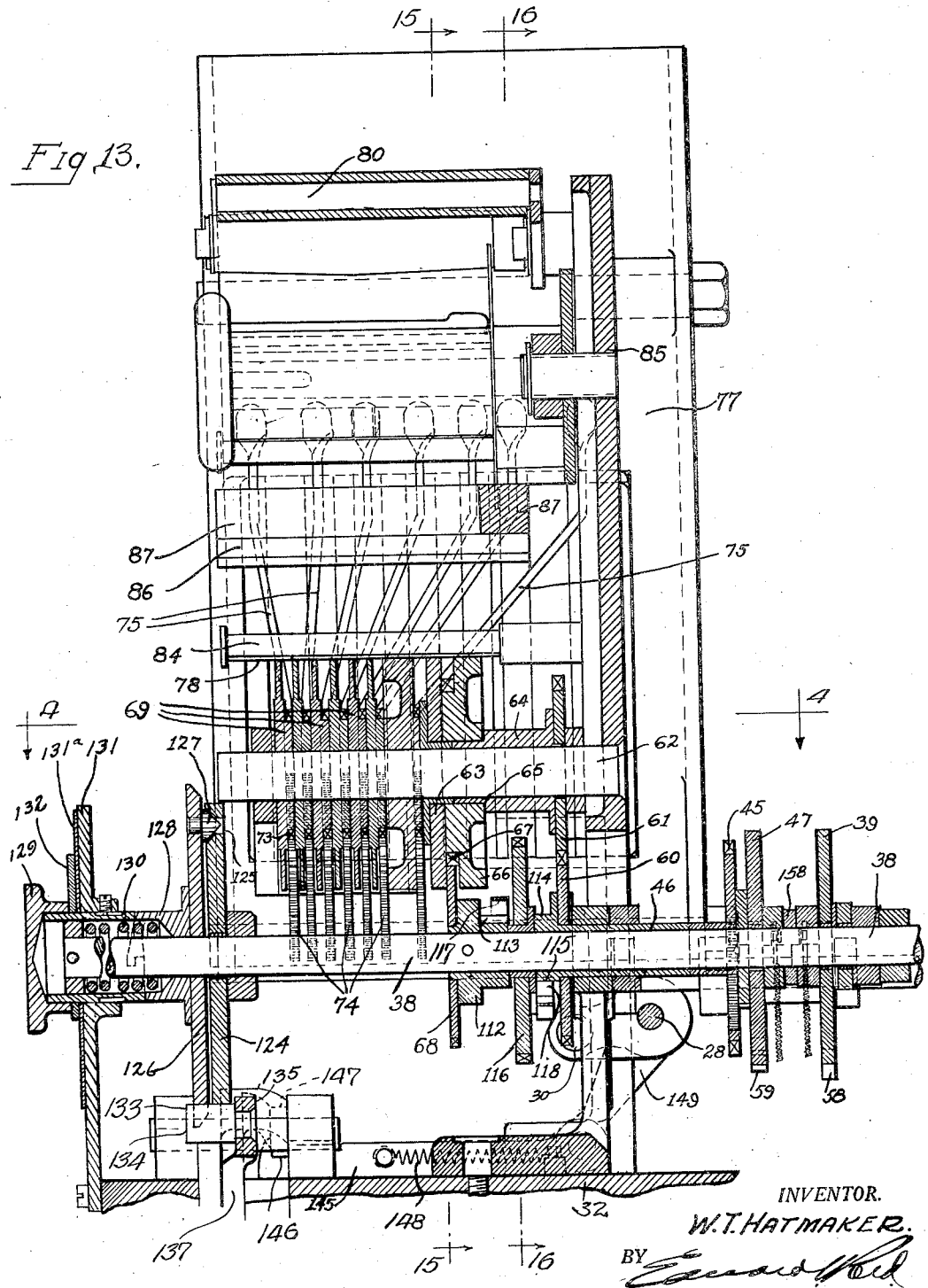

Jan. 6, 1931.                W. T. HATMAKER                1,788,236
                           LIQUID DISPENSING PUMP
                    Filed Aug. 18, 1920     12 Sheets-Sheet 11
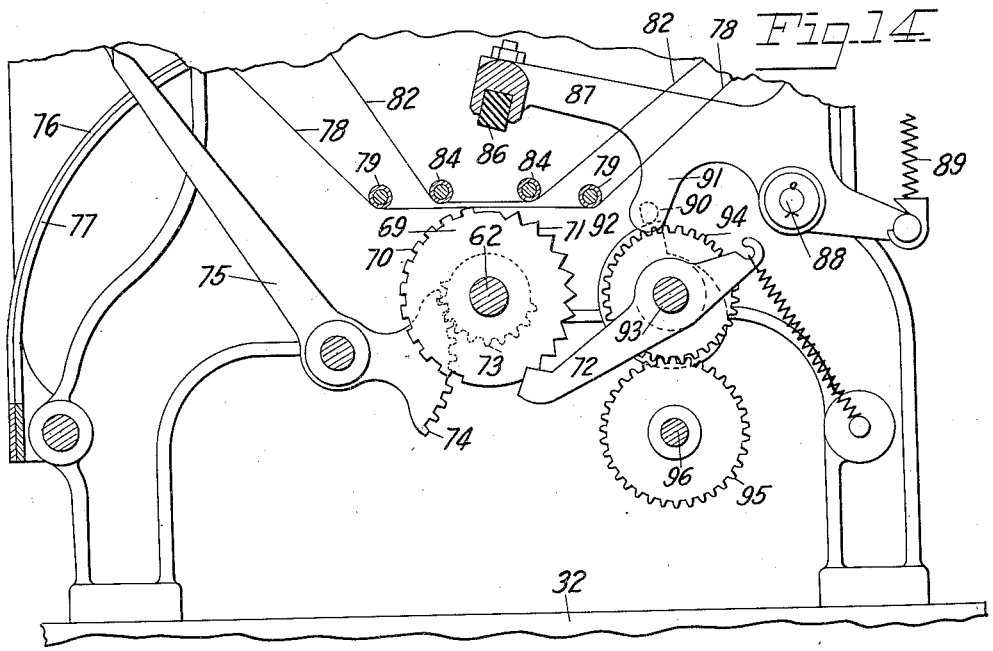
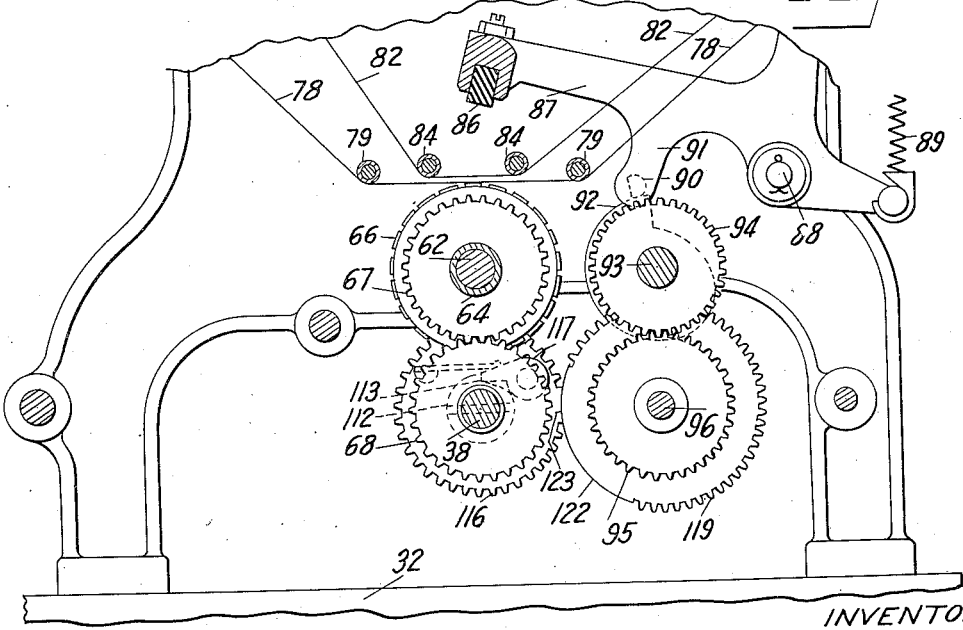
INVENTOR.
W. T. HATMAKER.
ATTORNEY.

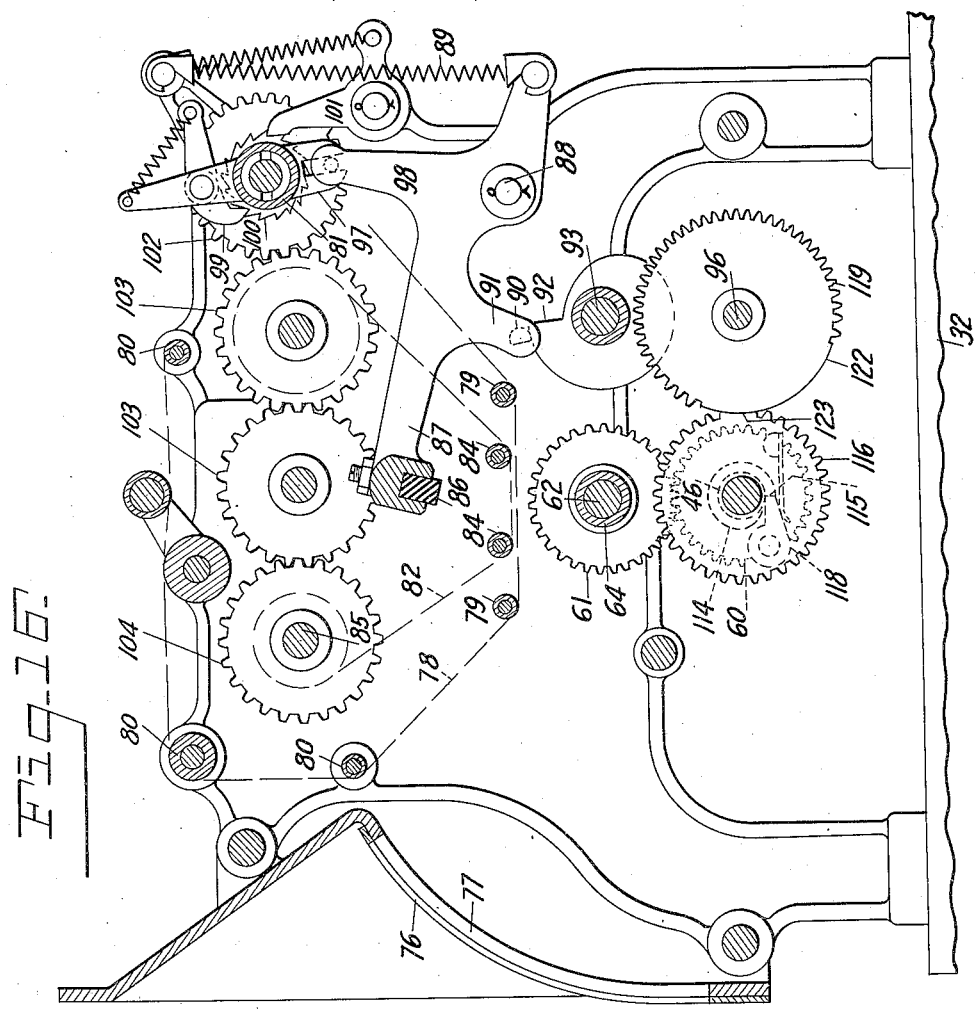

Patented Jan. 6, 1931

1,788,236

UNITED STATES PATENT OFFICE

WILLIAM T. HATMAKER, OF DAYTON, OHIO, ASSIGNOR TO THE NATIONAL PUMPS CORPORATION, OF DAYTON, OHIO, A CORPORATION OF OHIO

LIQUID-DISPENSING PUMP

Application filed August 18, 1920. Serial No. 404,354.

This invention relates to recording devices for liquid dispensing pumps and is in the nature of an improvement on the mechanism shown and described in the application for patent filed by me March 12, 1919, Serial No. 282,163, which issued January 27, 1925, as Patent No. 1,524,620.

The object of the invention is to provide a device which will be operated by the dispensing apparatus to accurately record and indicate the quantity of liquid dispensed; and which will be simple in its construction and operation and of such a character that it will not be easily disarranged in such a manner as to affect its accuracy.

A further object of the invention is to provide such a device in which the operation of the several parts will be so controlled as to make it necessary to perform the several operations in the proper relation one to the other.

A further object of the invention is to provide such a device with means for embodying in the record a mark, or number, such as an automobile license number, to identify the customer to whom each sale was made.

Other objects of the invention will appear as the mechanism is described in detail.

Figure 1:
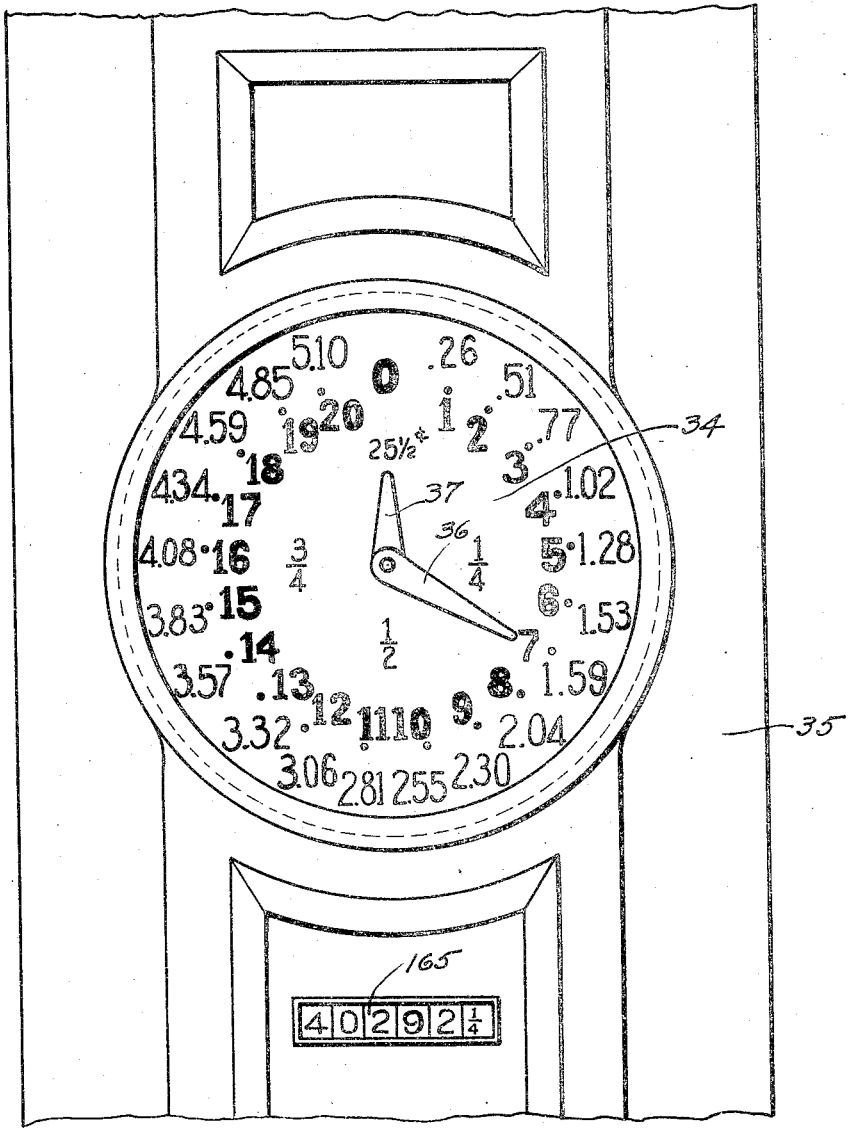
Figure 12:
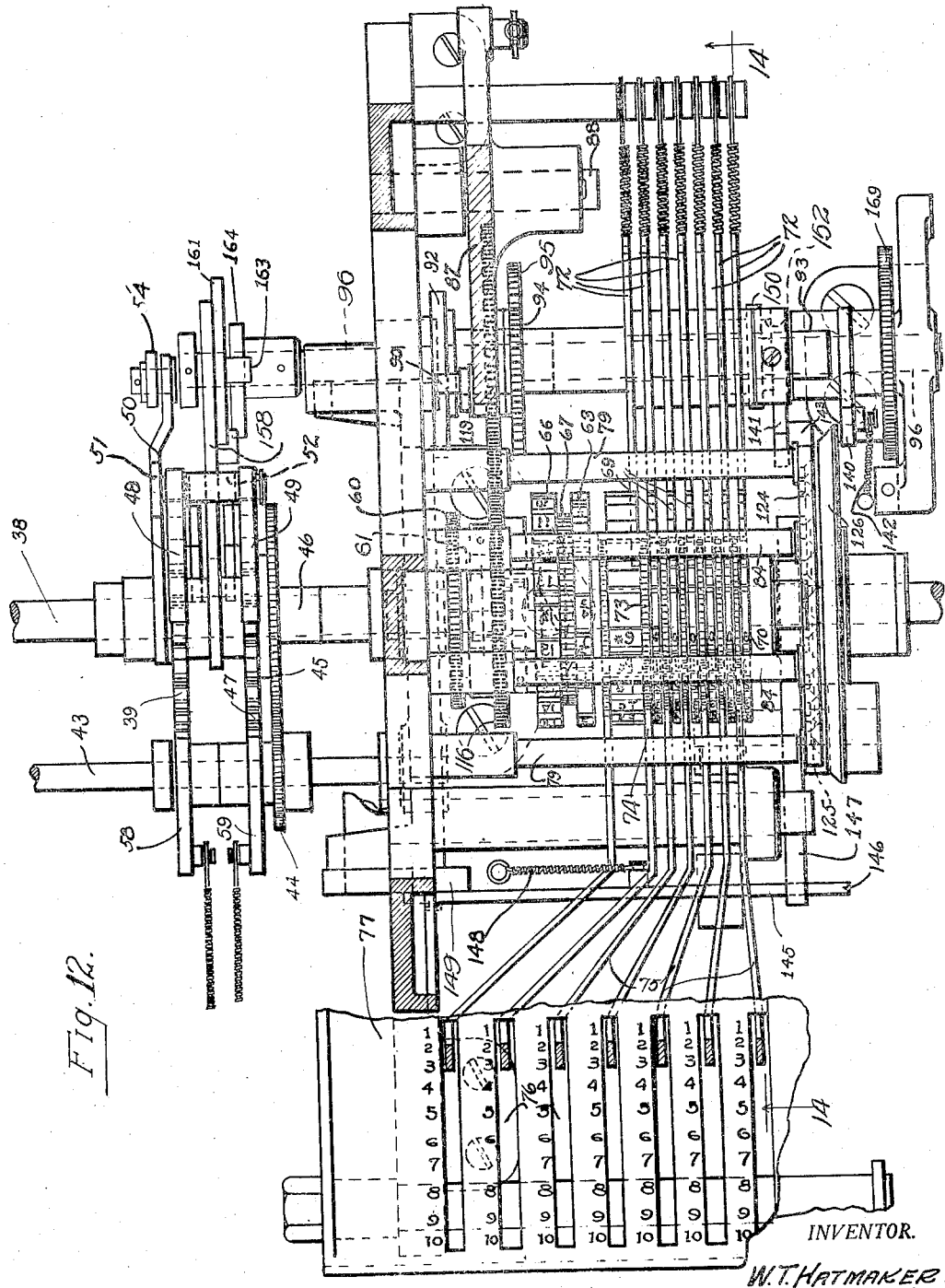

In the accompanying drawings Fig. 1 is a front elevation of a portion of the dispensing apparatus embodying my invention, and showing the indicating dial; Fig. 2 is a side elevation of such an apparatus, partly broken away; Fig. 3 is a rear elevation of a portion of the dispensing apparatus and recording devices, omitting the printing mechanism; Fig. 4 is a horizontal sectional view taken on the line 4—4 of Fig. 3, showing the recording and printing shaft of the predetermining device and their associated parts in plan; Fig. 5 is a detail sectional view taken on the line 5—5 of Fig. 4; Fig. 6 is a transverse sectional view taken on the line 6—6 of Fig. 4; Fig. 7 is a transverse sectional view taken on the line 7—7 of Fig. 4; Fig. 8 is a transverse sectional view taken on the line 8—8 of Fig. 4; Fig. 9 is a transverse sectional view taken on the line 9—9 of Fig. 4; Fig. 10 is a transverse sectional view taken on the line 10—10 of Fig. 4; Fig. 11 is a rear elevation of the recording mechanism with the cabinet removed; Fig. 12 is a horizontal section taken on the line 12—12 of Fig. 11; Fig. 13 is a vertical section taken on the line 13—13 of Fig. 11; Fig. 14 is a transverse section taken through the recording mechanism taken on the line 14—14 of Fig. 12; Fig. 15 is a transverse section through the recording mechanism taken on the line 15—15 of Fig. 13; Fig. 16 is a transverse section through the recording mechanism taken on the line 16—16 of Fig. 13.

In these drawings I have illustrated one embodiment of my invention and have shown the same as applied to a liquid dispensing pump of the type shown and described in the application for patent filed by me on the 19th day of July, 1920, Serial No. 397,491, which issued May 17, 1921, as Patent No. 1,378,029, but it will be understood that this embodiment has been chosen for the purpose of illustration only and that the invention may be embodied either in its present form, or with modifications thereof, in pumps, or dispensing apparatus, of various kinds.

The particular dispensing apparatus here shown comprises a double cylinder pump, one of the cylinders being shown at 1 in Fig. 2, and the pistons of each cylinder, which are not here shown, have connected therewith piston rods one of which is shown at 2, and which are provided with toothed extensions, or racks, 4 and 5, respectively (Fig. 3). These racks mesh with the opposite sides of the driving gear 6 which is rotated alternately in opposite directions to actuate the respective pistons to alternately raise and lower the pistons. This operative movement may be imparted to the gear 6 in any suitable manner but in the present construction I operate the apparatus by means of a suitable operating member which has operative movement in one direction only, and means are provided for automatically reversing the direction of movement of the gear 6 when the latter has reached the limit of its movement in either direction. As here shown, the operating mechanism comprises a crank 7 rotatably mounted on the outer end of an operating shaft 8 and operatively connected with a ratchet wheel 138 which is also rotatably mounted on the shaft 8. The connection between the crank and the ratchet wheel is a non-rotatable one but is preferably separable to permit the crank to be removed from the shaft. The ratchet wheel 138 carries a pawl 10 which engages a second ratchet wheel 10a rigidly secured to the shaft 8, whereby the rotation of the crank in a forward direction will impart operative movement to the shaft 8. Mounted upon the shaft 8 for rotation therewith but capable of sliding movement thereon is a pinion 9 (Figs. 2 and 8) which is adapted to be connected with the gear 6 through either of two sets of gearing which are respectively so arranged as to cause the gear to rotate in opposite directions. When the pinion 9 is in one position it will mesh directly with a gear 11 rigidly secured to the driving gear 6. When the pinion is in its other position it will mesh with a gear 12 to which is rigidly secured a second gear 13 which meshes directly with the driving gear 6. The pinion is automatically shifted from one position to another by a spring actuated device which is controlled by the rotation of the gear 6. As here shown, this device comprises a rod 14 pivotally connected to one end of an arm 15 which in turn is pivotally mounted for movement about the axis of the gear 6 and is arranged to be engaged by either of two pins 16 and 17, rigidly connected with the gear 6 and, in the present instance, carried by a cam 18 which is rigidly secured to the gear 11. The hub of the pinion 9 is provided with a lateral extension in the form of a grooved collar 9a with which engages a pin carried by the free end of an arm 19 pivotally mounted above the pinion and having connected therewith an arm 20 which in turn is connected with a collar 21 slidably mounted on the rod 14. Coiled about the rod 14 on opposite sides of the collar 21 are two springs 22 and 23 which are confined between the slidable collar 21 and the fixed collars 24 and 25. As the gear approaches the limit of its movement in either direction one of the pins, 16 and 17, will engage the arm 15 and move the rod 14 either upwardly or downwardly according to the direction of movement of the gear. The arm 19 and, consequently, the collar 21 are held against movement until the gear 6 has nearly completed its movement, when the yoke is released to permit the spring, which has been compressed by the movement of the rod 14, to expand and thus shift the pinion. To hold the arm 19 normally against movement an arm 26 is rigidly connected therewith and is arranged to engage a dog 27 pivotally mounted on a shaft 28 and having its free end arranged to engage either the upper or lower edge of the arm 26. Connected with the shaft 28 which carries the dog 27 are arms 29 (Figs. 2 and 4) in which are mounted studs 30 the ends of which lie in the paths of plungers 31 slidably mounted in a frame member 32 and having their lower ends arranged in the paths of lugs 33 carried by the respective racks and so arranged that the lug of either rack will engage its cooperating plunger just before the rack completes its upward movement, thus moving the dog 27 out of engagement with the arm 26 and releasing the spring actuated device. The operating mechanism so far described is a part of the last mentioned application and forms no part of the present invention except in so far as it enters into combination with the recording devices.

In the present embodiment of the invention I have shown the mechanism as provided with an indicating device and with a recording device, both of which are operated through the same mechanism. As here shown, the indicating device comprises a dial 34 mounted upon the front of the casing 35, (Figs. 1 and 4) within which the mechanism is housed, and having thereon a series of figures arranged about the axis thereof to indicate gallons and having arranged within the first mentioned series of figures, a second series of figures representing fractions of gallons, or quarts. In the present arrangement the figures representing gallons run from 1 to 20 and the figures representing quarts are four in number. As here shown, these latter figures are in the form of fractions, ¼, ½ and ¾ and the fourth figure, which would be the integer 1, is omitted and in its position is placed the price per gallon of the gasoline, or other liquid, which is being dispensed. The present dial is also provided adjacent each gallon indication with the price of that particular number of gallons, the dial being removable to enable it to be changed as the price changes. Travelling over the face of the dial are two hands 36 and 37, the longer hand 36 cooperating with the gallons indications and the shorter hand 37 cooperating with the quarts indications. The hand 36, that is the gallon pointer, is directly mounted upon the end of a shaft 38 which is journaled in the frame of the mechanism and has secured thereto a ratchet wheel 39. (Figs. 2, 4 and 10.) The other hand 37, that is the quarts pointer, is secured to a sleeve 40 which telescopes the shaft 38 and has secured thereto within the housing a gear 41 which meshes with a second gear 42 rigidly secured to a shaft 43. Mounted on the shaft 43 is another gear 44 meshing with a gear 45 mounted upon a sleeve 46 which telescopes the shaft 38 beyond the ratchet wheel 39, and the gear 45 has rigidly secured thereto a second ratchet wheel 47, (Figs. 2, 4 and 9) which is rotatable upon the shaft 38, the two ratchet wheels 39 and 47 being arranged adjacent one to the other but spaced a short distance apart. These ratchet wheels are provided with pawls which are actuated by the dispensing apparatus to cause the ratchet wheels to be advanced distances corresponding to the amount of liquid dispensed. As shown in Figs. 4, 9 and 10, a pawl 48 cooperates with the ratchet wheel 39 and a pawl 49 cooperates with the ratchet wheel 47, these pawls being preferably connected one to the other so that they will operate in unison. In the construction shown in Figs. 4, 9 and 10 both are mounted upon a common pawl carrier comprising an arm 50 mounted for rocking movement about the axis of the shaft 38 and having an upwardly extending projection 51 in which is mounted a stud 52 which carries the pawls. A spring 53 connected with the pawls tends to move the same toward the respective ratchet wheels. Connected with the pawl carrier 50 is a link 54, the lower end of which is pivotally connected with an arm 55 (Figs. 2, 8 and 10) mounted for rocking movement about a stud mounted in the frame and provided with a lateral extending projection, or pin, 56 which rides over the periphery of the cam 18, which, as has been stated, is secured to the operating gear 6. In the present instance, this cam is so shaped that it will impart four separate oscillations to the arm 55 for each complete movement of the gear, these oscillations being equally spaced one from the other so as to represent quarts, it being understood that each cylinder discharges a gallon of liquid upon each operation of its piston. The oscillations of the arm 55 are transmitted by the link, or pitman, 54 to the pawls. Inasmuch as the gallons ratchet wheel is directly connected with its pointer, or hand, 36 and advances this hand the space of one gallon for each step, or tooth, thereon, it is necessary that means be provided for preventing the operation of the gallons ratchet wheel upon each operation of the pawl carrier. I have, therefore, provided the quarts ratchet wheel, 47, in advance of every fourth tooth with a deep notch 561, the notches preceding the other teeth being relatively shallow, as shown at 57. The two pawls are mounted in such positions relatively one to the other that when the pawl 49 for the quarts ratchet wheel is in one of the shallow notches 57 the pawl 48, for the gallons ratchet wheel, will be held out of engagement with its ratchet wheel and the movements imparted thereto will be idle movements, but when the pawl 49 drops into one of the deep notches, as it will on every fourth operation of the pawl carrier, the pawl 48 moves into engagement with its ratchet wheel and, consequently, both ratchet wheels will be operated upon every fourth movement of the pawl carrier. Cooperating with both ratchet wheels are detent and alining pawls 58 and 59 which are mounted on the shaft 43 and which are spring actuated and which serve both to prevent the reversal of the ratchet wheels and to properly center, or aline, the ratchet wheels at the end of each movement thereof. The ratchet wheels 39 and 47 serve also to operate the recording wheels or type wheels and, as here shown, the gear 45 which is secured to the quarts ratchet wheel 47 is mounted on a sleeve 46, as above described, and this sleeve has secured thereto a gear 60 (Figs. 4, 13 and 16) which meshes with a gear 61 mounted on a counter shaft 62 and connected with a quarts type wheel 63. As here shown, the type wheel 63 is carried by a sleeve 64 rotatably mounted on the shaft 62 and having formed therein, adjacent to the type wheel 63, a circumferential groove 65 in which is rotatably mounted the gallons type wheel 66. The type wheel 66 is provided with a gear 67 with which meshes a gear 68 rigidly secured to the shaft 38. The ratio of the gearing between the ratchet wheels 39 and 47 and the type wheels 66 and 63 is such that the type wheels will be advanced distances corresponding to the advancement of the indicator pointers 36 and 37 and in this manner the type wheels are caused to record the quantity of liquid discharged. In the present machine I have also shown means for setting up in the recorder an indicating mark, or number, by means of which the purchaser of each quantity of liquid may be identified. This number may conveniently be the automobile license number, as dispensing pumps of this type are very extensively used at automobile filling stations. As shown in Figs. 12, 13, and 14, I have mounted on the counter shaft 62 a series of type wheels, or counters, 69, each having on one side of its periphery a series of type faces 70 carrying the numerals 1 to 0 and having upon its opposite side V-shaped teeth 71 with which cooperate a series of detent and alining pawls 72. Each type wheel 69 has secured thereto a gear 73 with which meshes a toothed segment 74 carried by a lever 75 the end of which extends through a slot 76 in a curved portion 77 of the casing, so that it is readily accessible for operation, the curved portion 77 of the casing being provided with figures adjacent to each slot to indicate the position of the type wheels. In this manner an accurate record is maintained of all purchasers and it will be obvious that if desired one or more of the type wheels 69 may carry marks, or type, suitable for indicating on the record whether the transaction was a cash transaction, a charge, or any other data which may be desirable.

A record may be taken from the recorder in any suitable manner and to a measure the character of this mechanism will depend upon the character of the recording devices. In the present instance, in which the recording devices comprise type wheels, I have provided a simple printing mechanism which will print the record on a strip of paper contained within the machine. As best shown in Figs. 11, 14, 15 and 16, this printing mechanism comprises an ink ribbon 78 which passes about guide rollers 79 adjacent to the printing position of the type wheels, thence about other guide rollers 80 to a feeding drum 81. In the present instance the ribbon is in the form of an endless band and is not wound upon the drum 81, but merely passes over the same. The material on which the record is taken is preferably in the form of a strip, or web, of paper 82 which is supported on a roller 83 and is passed about guides 84 adjacent to the printing position of the type wheels and above the ribbon 78, thence to a rewinding roller 85. The printing is effected by means of a platen 86 carried by a platen arm 87 which is pivotally mounted at 88 and is acted upon by a spring 89 which tends to move the same toward the type wheels. The platen is held normally in its elevated or inoperative position by means of a projection, or stud, 90 carried by a downwardly extending portion, or arm, 91 secured to the platen arm 87 and which engages the periphery of a cam 92 rigidly mounted on a shaft 93 (Figs. 12 and 15), which cam has secured thereto a gear 94 meshing with a second gear 95 on a shaft 96 which extends beyond the casing and is provided with a handle 296, (Fig. 4), and which may be conveniently referred to as the printing shaft. When the mechanism is in its normal, or idle, position, the stud 90 will rest upon the periphery of the cam and hold the platen elevated. Upon the first movement of the cam the stud will clear the projection thereon, which is preferably radial, and the spring 89 will move the platen into engagement with the paper above the type wheels, thus causing the record to be taken. The further movement of the cam as the mechanism is returned to its normal position again elevates the platen to its idle position. The ribbon and paper are preferably advanced one step upon each operation of the platen and to this end I have mounted on the axis of the ribbon drum 81 a rock arm 97 (Fig. 16) one end of which is connected by a pin and slot connection with an upwardly extending arm 98 carried by the platen lever 87. Pivotally mounted on this rock arm 97 is a spring actuated pawl 99 which engages the teeth of a ratchet wheel 100 secured to the drum 81. The arrangement of the pawl and the rock arm are such that upon the downward, or operative, movement of the platen the pawl will be caused to ride rearwardly over the teeth of the ratchet wheel and upon the return movement of the platen the pawl will pick up the ratchet wheel and rotate the drum. A detent pawl 101 serves to hold the drum against rearward movement. The paper feeding devices are also actuated by this same pawl and ratchet mechanism and to this end the drum has secured thereto a gear 102 which is connected by intermediate gears 103 with a gear 104 secured to the rewinding roller 85. Consequently, both the paper and the ribbon will be advanced after each impression has been taken and after the platen has been moved out of engagement with the paper.

Means are also provided for positively checking the movement of the printing mechanism when the shaft 96 has made one complete rotation. To this end I have rigidly secured to the shaft 96 a locking disk, or plate, 105 (Figs. 3 and 11) having its periphery cut away on one side and provided with a notch 106, adapted to receive one end of a pawl 107 pivotally mounted on the frame of the machine at 108, which pawl serves to check the movement of the shaft. The position of the pawl with relation to the locking plate is controlled by an arm 109 rigidly connected therewith and cooperating with a pin 110 carried by the locking plate 105. A spring 111 connected with the arm 109 tends to move the pawl out of line with the notch in the periphery of the locking plate. With the parts in their normal positions as shown in Fig. 3, the locking plate and, consequently, the printing mechanism and its associated parts are locked against movement. To release the mechanism for operation a slight rearward movement is imparted to the shaft 96 by means of its operating handle, thus permitting the spring 111 to move the pawl out of alinement with the notch. This movement of the shaft causes the pin 110 to pass on the outside of the arm 109. The shaft is then rotated in a forward direction and the notched portion of the locking plate will move past the end of the pawl, thus permitting the forward movement of the shaft. As the shaft approaches the completion of its rotation the pin 110 will engage the inner face of the arm 109 and move the pawl into the path of the notched portion 106 of the locking plate and hold the same there until the edge of the plate has passed the end of the pawl, thus insuring the cooperative engagement of the plate and the pawl which then serves to positively check the movement of the shaft and its connected parts.

The printing shaft 96 is normally held against rearward movement by a pawl 168 which engages a ratchet wheel 169 secured to the shaft (Figs. 4 and 5). In order to permit the rearward movement of the shaft, to release the same from its locking mechanism, I have cut away three of the teeth of the ratchet wheel, as shown at 170, at a point which will lie opposite the nose of the pawl when the shaft is in its normal, or home, position. This will permit of the slight rearward movement necessary to release the shaft without permitting enough rearward movement to affect the mechanism as a whole and without permitting the rearward movement after the operation of the printing and resetting mechanism has begun.

I have also provided means, operated by the same mechanism which operates the printing devices, to reset the recording devices and the indicating devices to zero. To accomplish this I have formed in the hub 112 (Figs. 13 and 15) of the gear 68 which actuates the gallons type wheel a spline cut, or one toothed ratchet, 113 and have formed in the hub 114 (Figs. 13 and 16) of the gear 60 which operates the quarts type wheel, and which is rigidly secured to the sleeve 46, a spline cut, or one toothed ratchet wheel, 115. A gear 116 (Figs. 4 and 13) is mounted on the shaft 38 between the hub 114 and the hub 112 and has mounted on opposite sides thereof pawls 117 and 118 adapted to engage the cuts, or teeth, of the respective hubs and rotate the same when the gear 116 is rotated. These pawls are arranged to rotate the gears in a forward direction so that they do not interfere with, but permit the free operative rotation of, the gears 60 and 68 in the recording operation of the machine. During this operation the resetting gear 116 remains stationary so that the pawls 117 and 118 are always in their home positions. When it is desired to reset the type wheels 63 and 66 to zero the gear 116 is rotated and the pawls pick up the toothed hubs of the gears 60 and 68 and advance them to the zero position, thus carrying both the type wheels 63 and 66 and the indicator pointers 36 and 37 to their zero, or home, positions. This movement is imparted to the resetting gear 116 from the printing shaft 96 to which is secured a gear 119 which actuates the resetting gear 116 upon each operation of the printing mechanism. It is necessary that time should be allowed for the operation of the platen before the resetting operation begins. I have, therefore, shown (Figs. 15 and 16) the gear 119 as having a portion of its periphery smooth, as shown at 122, which portion is normally in engagement with a smooth portion 123 of the resetting gear 116, the smooth portion of the latter gear being concave to receive the convex surface of the smooth portion of the gear 119, thus providing what is in effect a Geneva lock between the two gears. Because of the cooperating concave and convex surfaces on the gears the gear 116 is held against rotation so long as the portion 123 thereof is in engagement with the portion 122 of the gear 119. When the printing shaft 96 is in its normal, or home, position the front end portion of the smooth surface 122 will be in engagement with the portion 123 of the resetting gear. Consequently, the gear 119 will move a distance equal to the length of the portion 122 thereof before the teeth thereof will engage the gear 116 and impart movement thereto and this interval is sufficient to permit the platen to operate and to be moved out of engagement with the paper. When the printing shaft has completed its single rotation the resetting gear 116 will have been moved through a complete rotation and restored to its normal position with the parts 122 and 123 of the two gears in the position shown in Figs. 15 and 16.

The mechanism is also provided with a predetermining device which can be set to cause the delivery of a predetermined quantity of liquid and which, when this quantity has been delivered, will automatically interrupt the operation of the dispensing apparatus. As shown in Figs. 4, 6 and 13, this predetermining device comprises a disk 124 rigidly secured to the recorder shaft 38 and having therein a circumferential series of openings 125. Rotatably mounted upon the shaft 38 is a second disk 126 having on that side thereof adjacent to the disk 124 a pin 127 adapted to enter any one of the openings in the disk 124 and to thereby connect the two disks together so that they will rotate in unison. The movable disk 126 is connected through a sleeve 128 with a knob 129 on the outer side of the casing 35 by means of which the disk 126 may be disengaged from the disk 124 and rotated to any desired position with relation thereto, and then again connected therewith by causing the pin 127 to enter the adjacent opening in the fixed disk 124. A spring 130 preferably acts upon the disk 126 to move the same toward and hold the same in operative relation to the disk 124 and the sleeve is formed in two parts connected by clutch members to prevent the disk from being rotated in a reverse direction by the knob. A plate 131, rigidly mounted on the frame, has on its outer side a scale 131ª (Fig. 11) arranged in line with an opening in the casing and carrying figures corresponding to the gallon indications on the dial 34, and a pointer 132 travels over this scale to indicate the position of the movable disk 126. The disk 126 has in the edge thereof a notch, or recess, 133 adapted to receive a lateral projection 134 carried by a rock arm 135 pivotally mounted adjacent to the disk 126 and acted upon by a spring 136 which tends to press the projection 134 into engagement with the edge of the disk. Rigidly connected with the rock arm 135 is a pawl 137 arranged to engage the ratchet wheel 138 with which the operating crank 8 is connected, (Figs. 2 and 6), the teeth of the ratchet wheel being so arranged that when engaged by the pawl 137 the crank will be held against forward movement and the dispensing mechanism locked against operation. The arrangement of the pawl with relation to the arm 135 is such that when the projection 134 lies in the recess 133 the pawl will operatively engage the ratchet wheel but when the projection is out of the recess and riding on the periphery of the disk the pawl will be held in an inoperative position with relation to the ratchet wheel. The arrangement of the recess 133 is such that when the disk is in its normal, or zero, position the recess will be in a position to receive the projection 134. When a quantity of liquid, say five gallons, is to be dispensed the knob 129 is operated to disconnect the disk 126 from the disk 124 and rotated until the pointer 132 indicates five gallons on the scale 131a when the knob is released and the movable disk 126 is connected with the fixed disk by the pin 127. The fixed disk 124 being rigidly secured to the shaft 38 will rotate therewith and as the shaft is rotated by the operation of the dispensing apparatus the two disks will move in unison until the movable disk 126 has returned to its zero position, at which time the projection 134 will enter the recess in the periphery of the disk, thus permitting the pawl to engage the ratchet wheel and lock the dispensing apparatus against further movement until the movable disk has again been moved from its zero position.

The knob 129 is connected with the movable disk by a one way clutch connection which permits the disk to be rotated by the knob in one direction only, but in order to positively lock the predetermining device against adjustment during the operation of the dispensing mechanism I have provided a positive lock which becomes operative as soon as the dispensing apparatus has been operated sufficiently to cause initial rotation to be imparted to the shaft 38, and remains operative until the predetermined quantity of liquid has been delivered, a record printed, and the recording device reset to zero. As shown in Figs. 4 and 6, this locking device comprises two arms 140 and 141 rotatably mounted upon the printing shaft 96 and rigidly connected one to the other. The arm 140 is so arranged with relation to the movable disk 126 that when unrestrained it will be moved into a position in front of and close to that disk, by means of a spring 142 connected therewith. The other arm 141 has secured thereto a pin 143 which engages the periphery of the disk 124 and limits the movement of the two arms by the spring and, further, supports the arm 141 in the path of a pin 144 secured to the inner face of the disk 124. This pin is so positioned on the disk that when the latter is in its normal position, that is, the position which it will occupy when the recording mechanism has been reset to zero, it will be in engagement with the arm 141 and will support the arm 140 out of alinement with the disk 126, thus permitting that disk to be adjusted relatively to the disk 124 to set the predetermining device. As soon as the dispensing apparatus has operated sufficiently to impart initial rotation to the shaft 38 the pin will be moved out of engagement with the arm 141 and the locking arm 140 will be moved into the path of the disk 126 thus locking the same in engagement with the disk 124 and retaining it in this position until the recording devices have again been reset to zero.

To prevent the pawl 137 from engaging the ratchet wheel 138 before the dispensing apparatus has completed delivery of the predetermined quantity, which might result from the gradual entrance of the pin 134 into the recess 133, I have provided a device which will hold the pawl in an inoperative position until the full measure, or gallon, of liquid has been discharged. This device comprises a bar 145 (Figs. 4, 6, 11 and 13) slidably mounted on the frame member which carries the recording mechanism and having its end portion or nose 146 arranged to extend beneath a finger 147 rigidly secured to the pawl 137 and to hold said pawl in an inoperative position and having a narrow portion to receive the finger 147 and permit the pawl to engage the ratchet wheel when the bar is moved lengthwise. A spring 148 tends to hold the bar 145 in a position with its nose in engagement with the finger 147. The opposite end of the bar is pivotally connected with a rock arm 149 which is rigidly secured to the shaft 28 which, as has been heretofore explained, is rocked by the rack bars just as each of these bars completes its delivery stroke. Consequently, at the end of the stroke of either rack bar the slide bar 145 will be moved against the tension of the spring 148 to carry the nose 146 thereof out of the path of the finger 147 of the pawl, thereby releasing the pawl. This operation will take place at the end of the delivery of each gallon of liquid but so long as the pin 134 is in engagement with the periphery of the disk 126 the pawl can not operate and, consequently, the mechanism will not be locked until the full predetermined quantity has been delivered and the recess 133 is again in line with the pin 134. In this manner I not only prevent the possibility of short stroking the dispensing apparatus and insure the delivery of full measures of liquid but I also insure the accurate registration of the liquid dispensed.

To prevent the operation of the dispensing apparatus after initial movement has been imparted to the printing and resetting mechanism and before these operations have been completed I have mounted on the printing shaft 96 (Figs. 4 and 7) a cam 150 having a projection so arranged that when the printing shaft is in its normal, or home, position this projection will engage a pin 151 carried by a pitman, or bar, 152 having one end slidably mounted upon the shaft 96 and having its other end pivotally connected with the tail 153 of a pawl 154 which is pivotally mounted on an arm 154ª on the frame and is arranged to engage the ratchet wheel 138 on the operating shaft 8 to lock the shaft against rotation. A spring 155 acts on the pitman 152 to move the same upwardly and thus move the pawl toward the ratchet wheel. So long as the projection of the cam is in engagement with the pin on the pitman the pawl will be held out of engagement with the ratchet wheel but as soon as initial movement is imparted to the printing shaft 96 this projection will be moved out of engagement with the pin and the spring will move the pawl into its operative position and retain the same there until the printing shaft has completed its rotation and the projection of the cam 150 has again engaged the pin and forced the pitman downward.

To prevent the ratchet wheels 39 and 47 of the recording mechanism from being drawn past their normal, or home, positions by the too rapid movement of the resetting mechanism, I have provided a stop mechanism which will check the movement of these ratchet wheels and will then be automatically moved out of engagement therewith. As best shown in Figs. 4, 9 and 10, the two ratchet wheels are provided on their adjacent faces with stops 156 and 157. Slidably mounted on the shafts 38 and 96 and arranged between the two ratchet wheels is a slotted bar, or pitman, 158 having thereon pins 159 which project beyond the opposite sides of the bar and when the latter is in its operative position lie in the paths of the respective stops 156 and 157. A spring 160 acts on the bar to move the pins 159 normally into inoperative positions and the printing shaft 96 has mounted thereon a cam 161 which acts on a projection 162 carried by the bar 158 to move the pins 159 into their operative positions during the rotation of the shaft. As the printing shaft approaches the end of its rotation the stops on the ratchet wheels will engage the pins 159 and the movements of the ratchet wheels will be checked and at this instant the cam 161 will clear the pin 162 and the bar will be moved outwardly by the spring 160. In order to permit the very rapid retraction of the bar I have mounted the cam 161 loosely on the shaft 96 and have secured thereto a pin 163 which lies between the two arms of a yoke 164 rigidly secured to the shaft 96. When the shaft is rotated the rear arm of the yoke will engage the pin on the cam and cause the latter to rotate, but when the peak of the cam passes the projection 162 the cam is free to move forwardly relatively to the yoke and thus permit the quick withdrawal of the bar 158.

I also prefer to provide a total counter which can not be reset and which will maintain a continuous record of all liquid dispensed by the apparatus. In the present drawing such a counter is shown at 165 in Figs. 1, 2 and 8, as arranged just below the dial 34. The counter itself may be of any usual or desired construction and its operating arm is connected by means of a link 166 with a rock arm 167 which is operatively connected with and preferably formed integral with the rock arm 55 which operates the pawl and ratchet mechanism of the recording device, so that this total register is operated in unison with the recording and indicating devices.

The operation of the mechanism will be clearly understood from the foregoing description of the several parts thereof and it will be apparent that I have provided a recording dispensing apparatus which is of such a character that it cannot be short stroked but will deliver accurate measures of liquid and will maintain an accurate record of the liquid discharged, the dispensing and recording mechanism being so interconnected as to insure their accurate cooperation. Further, it will be apparent that the mechanism is of such a character that the several operations necessary to the delivery of the liquid and taking of the record must be accomplished in their proper order.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a recording mechanism for a reciprocatory measuring pump, a recording device, means adapted to be controlled by the reciprocatory movement of said pump to cause said device to record the quantity of liquid discharged thereby, means for taking a record from said recording device, and means controlled by said record taking means to lock said dispensing apparatus against operation while said record is being taken.

2. In a recording mechanism for a reciprocatory measuring pump, a recording device, means adapted to be controlled by the reciprocatory movement of said pump to cause said device to record the quantity of liquid discharged thereby, and means for taking a record from said recording device and for resetting the same to its initial position, and automatically controlled means for locking said dispensing apparatus against operation until said record has been taken and said recording device reset.

3. In a recording mechanism for a reciprocatory measuring pump, a recording device, means adapted to be controlled by the reciprocatory movement of said pump to cause said device to record the quantity of liquid discharged thereby, means for taking a record from said recording device, and automatically controlled means to render said dispensing apparatus inoperative while said record is being taken.

4. In a recording mechanism for a reciprocatory pump, a visual indicator and a recording device, means adapted to be controlled by the reciprocatory action of said pump for operating said indicator and said recording device, means for taking a record from said recording device and for resetting said recording device and said indicating device to their initial positions, and means controlled by the last mentioned means to render said dispensing apparatus inoperative while said last mentioned means is being operated.

5. In a recording mechanism for an apparatus for dispensing measured quantities of liquid, devices to respectively record quarts and gallons, pawl and ratchet wheel mechanisms for operating the respective recording devices, means for operatively connecting said pawl and ratchet wheel mechanisms with said dispensing apparatus to cause one ratchet wheel to be advanced upon the delivery of each quart of liquid and to cause the other ratchet wheel to be advanced upon the delivery of each gallon of liquid.

6. In a recording mechanism for an apparatus for dispensing measured quantities of liquid, devices to respectively record quarts and gallons, pawl and ratchet mechanisms for operating the respective recording devices, an actuating member connected with the pawls of both pawl and ratchet mechanisms, means for imparting movement to said member upon the delivery of each quart of liquid, and means for causing the pawl and ratchet mechanism for the gallons recording device to operate upon each fourth movement only of said actuating member.

7. In a recording mechanism for an apparatus for dispensing measured quantities of liquid, devices to respectively record quarts and gallons, a separately operable ratchet wheel connected with each of said recording devices, pawls for the respective ratchet wheels, a single operating member for both pawls, means for imparting movement to said operating member upon the delivery of each quart of liquid, and means for rendering the pawl for the gallons ratchet wheel inoperative during three of each four movements of said actuating member.

8. In a recording mechanism for an apparatus for dispensing measured quantities of liquid, devices for respectively recording quarts and gallons, separately operable ratchet wheels connected with the respective recording devices, a ratchet wheel for the quarts recording device having a deep recess in advance of every fourth tooth, pawls for the respective ratchet wheels, said pawls being rigidly connected one to the other in such relation that the pawl for the gallon ratchet wheel can engage said ratchet wheel only when the pawl for the quart ratchet wheel is in one of said deep recesses, and means controlled by said dispensing apparatus for imparting movement to both pawls upon the delivery of each quart of liquid.

9. In a recording mechanism for an apparatus for dispensing measured quantities of liquid, a dial having indications for quarts and for gallons, separate pointers to travel over the respective indications, recording devices to respectively record quarts and gallons, a ratchet wheel connected with the gallons pointer and the gallons recording device, a second ratchet wheel connected with the quarts pointer and the quarts recording device, pawls for said ratchet wheels, means for operatively connecting said pawls with said dispensing apparatus to actuate the pawls upon the delivery of each quart of liquid, and means to render the pawl for the gallon ratchet wheel inoperative during three out of each four movements thereof.

10. In a recording mechanism for an apparatus for dispensing measured quantities of liquid, a shaft, a dial arranged at one end of said shaft, a sleeve rotatably mounted on said shaft adjacent to said dial, separate pointers mounted on said shaft and said sleeve for movement over said dial, a ratchet wheel rigidly secured to said shaft, a second ratchet wheel loosely mounted on said shaft and operatively connected with said sleeve, a second sleeve rotatably mounted on said shaft and operatively connected with the last mentioned ratchet wheel, a recording device operated by the rotation of said sleeve, a second recording device operated by the rotation of said shaft, pawls for the respective ratchet wheels, and means controlled by said dispensing apparatus to cause one of said ratchet wheels to be actuated upon the delivery of each quart of liquid and to cause the other of said ratchet wheels to be actuated upon the delivery of each gallon of liquid.

11. In a mechanism for dispensing measured quantities of liquid, and comprising an operating mechanism, a predetermining device comprising a member to be rotated by said dispensing apparatus, a second member adjustable relatively to the first mentioned member, means for connecting said second member with said first mentioned member in different positions relatively thereto, a device for rendering said dispensing apparatus inoperative, and means controlled by said second member for causing the operation of said device when said second member has been returned to its initial position, and means to prevent the adjustment of said second member relatively to the first mentioned member after initial movement has been imparted to said second member by said dispensing apparatus.

12. In an apparatus for dispensing measured quantities of liquid and comprising a part adapted to make one full movement for each full measure of liquid discharged, and operating mechanism therefor, a locking member connected with said dispensing apparatus, a cooperating locking member movable into and out of operative engagement therewith, a predetermining device operatively connected with said dispensing apparatus for movement thereby, and having means for controlling the operation of the last mentioned locking device, other means for holding said last mentioned locking device normally in an inoperative position and for releasing the same at the end of each stroke of said part of said dispensing apparatus.

13. In an apparatus for dispensing measured quantities of liquid and comprising reciprocatory members and operating devices therefor, a ratchet wheel connected with said dispensing apparatus, a pawl adapted to engage said ratchet wheel to lock said apparatus against operation, a predetermining device comprising a member adapted to be rotated by the operation of said dispensing apparatus, a second member adapted to be connected with the first mentioned member in adjusted positions relatively thereto, an arm connected with said pawl and having a part adapted to engage the edge of said second member and to hold said pawl in an inoperative position, said second member having a recess in the edge thereof to receive said part of said arm and permit said pawl to be moved into its operative position when said second member of said predetermining device is restored to its initial position, a finger connected with said pawl, a detent movable into engagement with said finger to hold said pawl in an inoperative position, and means actuated by the reciprocatory members of said dispensing apparatus to move said detent out of engagement with said finger of said pawl at the end of an operative movement of either of said reciprocatory members.

14. In an apparatus for dispensing measured quantities of liquid, and comprising reciprocatory members and operating devices therefor, a ratchet wheel connected with said dispensing apparatus, a pawl adapted to engage said ratchet wheel to lock said apparatus against operation, a predetermining device comprising a member adapted to be rotated by the operation of said dispensing apparatus, a second member adapted to be connected with the first mentioned member in adjusted positions relatively thereto, an arm connected with said pawl and having a part adapted to engage the edge of said second member and to hold said pawl in an inoperative position, said second member having a recess in the edge thereof to receive said part of said arm and permit said pawl to be moved into its operative position when said second member of said predetermining device is restored to its initial position, a finger connected with said pawl, a bar having a part movable into and out of engagement with the finger of said pawl and adapted to hold said pawl in an inoperative position when in engagement with said finger, a rock shaft, an arm carried by said rock shaft and connected with said bar to move the same into an inoperative position when said shaft is rotated, and means actuated by said reciprocatory members of said dispensing apparatus to impart rotatory movement to said shaft at the end of the operative movement of either of said members.

15. In a liquid dispensing apparatus comprising mechanism for operating the same, a recording device controlled by said operating mechanism, means to take a record from said recording device, and means to prevent a subsequent operation of said dispensing apparatus until a record pertaining to the next preceding operation has been taken from said recording device.

16. In a liquid dispensing apparatus comprising mechanism for operating the same, and means to lock said apparatus against operation, a recording device controlled by said operating mechanism, means to take a record from said recording device, and means controlled by said record taking means to actuate said locking means to release said dispensing apparatus.

17. In a liquid dispensing apparatus comprising mechanism for operating the same, and means to lock said apparatus against operation when a predetermined quantity of liquid has been discharged, a recording device, controlled by said operating mechanism, and means to take a record from said recording device and to release said apparatus from said locking means.

18. In a liquid dispensing apparatus comprising mechanism for operating the same, and means to lock said apparatus against operation when a predetermined quantity of liquid has been discharged, a recording device controlled by said operating mechanism, means to take a record from said recording device, and an operative connection between said record taking means and said locking means.

19. In a liquid dispensing apparatus comprising mechanism for operating the same, and means to lock said apparatus against operation, a printing counter controlled by said operating mechanism, a printing device to take a record from said counter, and means controlled by the operation of said printing device to release said apparatus from said locking means.

20. In an apparatus for dispensing measured quantities of liquid comprising a recording device for separately recording quarts and gallons, ratchet wheels connected with the respective recording devices, pawls for the respective ratchet wheels, a single actuating member for actuating both pawls, a four point cam connected with said dispensing apparatus and arranged to operate said actuating member, and means for rendering one of said pawls inoperative during three out of every four movements of said actuating member.

21. In an apparatus for dispensing measured quantities of liquid comprising a recording device, means controlled by said dispensing apparatus for operating said recording device, and means including a shaft for taking a record from said recording device, a ratchet wheel connected with said dispensing apparatus, a pawl to engage said ratchet wheel and lock said dispensing apparatus against movement, and means controlled by the position of said shaft for moving said pawl into and out of its operative position.

22. In an apparatus for dispensing measured quantities of liquid comprising a recording device, means controlled by said dispensing apparatus for operating said recording device and means including a shaft for taking a record from said recording device, a ratchet wheel adapted to be connected with said dispensing apparatus, a pawl to engage said ratchet wheel and lock said dispensing apparatus against movement, a spring tending to move said pawl into engagement with said ratchet wheel, a bar connected with said pawl and having a lateral projection arranged adjacent to said shaft, a cam secured to said shaft and having a part arranged to engage the projection on said bar when said shaft is in its normal position and to be moved out of engagement with said projection when initial movement has been imparted to said shaft, thereby permitting said pawl to be actuated by said spring.

23. In an apparatus for dispensing measured quantities of liquid comprising a recording device controlled by said dispensing apparatus, and printing mechanism for taking a record from said recording device, a predetermining device comprising two parts one of which is movable into adjusted positions with relation to the other, means to prevent the adjustment of said movable member relatively to the other member after initial movement has been imparted to said dispensing apparatus, and means controlled by said printing mechanism to release said member for adjustment.

24. In an apparatus for dispensing measured quantities of liquid, a predetermining device comprising a member actuated in accordance with the quantity of liquid discharged by said dispensing apparatus, a second member adapted to be connected with the first mentioned member in adjusted positions relatively thereto, and means controlled by the first mentioned member to prevent said second member from being adjusted relatively to the first mentioned member during the operation of said dispensing apparatus.

25. In an apparatus for dispensing measured quantities of liquid, a predetermining device comprising a member rotatable in accordance with the quantity of liquid discharged by said dispensing apparatus, a second member adapted to be connected with the first mentioned member in adjusted positions relatively thereto, means for restoring the first mentioned member of said predetermining device to its initial position, a locking device controlled by the movements of the first mentioned member of said predetermining device to prevent the second member thereof from being adjusted relatively thereto after initial movement has been imparted to the first mentioned member and to release said second member for adjustment after said first mentioned member has been returned to its initial position.

26. In an apparatus for dispensing measured quantities of liquid, a predetermining device comprising a member rotatable in accordance with the quantity of liquid discharged by said dispensing device, a second member adapted to be connected with the first mentioned member in adjusted positions relative thereto, means for restoring the first mentioned member of said predetermining device to its initial position, a locking arm pivotally mounted for movement into the path of the second member of said predetermining device to lock the same against adjustment relative to the first mentioned member thereof, a projection carried by said first mentioned member, and a part connecting said locking arm and controlled by said projection to move said locking arm out of its operative position with relation to said second member.

27. In an apparatus for dispensing measured quantities of liquid, a predetermining device comprising a member rotatable in accordance with the quantity of liquid discharged by said dispensing apparatus, a second member adapted to be connected with the first mentioned member in adjusted positions relative thereto, means for restoring the first mentioned member of said predetermining device to its initial position, a locking arm pivotally mounted for movement into and out of a position to lock said second member against adjustment relative to the first mentioned member, a second arm rigidly connected with said locking arm and arranged adjacent to said first mentioned member, and a projection carried by said first mentioned member and adapted to engage said second arm and hold the locking arm in inoperative position when said first mentioned member is in its initial position.

In testimony whereof, I affix my signature hereto.

WILLIAM T. HATMAKER.